(12) United States Patent  
Sato

(10) Patent No.: US 7,255,298 B2
(45) Date of Patent: Aug. 14, 2007

(54) MAGAZINE AND IMAGE RECORDING APPARATUS IN WHICH MAGAZINE IS USED

(75) Inventor: Susumu Sato, Saitama (JP)

(73) Assignee: Fujinon Corporation, Saitama (JP)

( * ) Notice: Subject to any disclaimer, the term of this patent is extended or adjusted under 35 U.S.C. 154(b) by 724 days.

(21) Appl. No.: 10/778,160

(22) Filed: Feb. 17, 2004

(65) Prior Publication Data

US 2004/0164197 A1 Aug. 26, 2004

(30) Foreign Application Priority Data

Feb. 17, 2003 (JP) ............................. 2003-037737

(51) Int. Cl.
  *G03B 23/02* (2006.01)
  *G11B 23/107* (2006.01)
(52) U.S. Cl. .................. 242/348; 242/588.2; 242/588; 242/588.6; 206/225; 400/613; 400/621
(58) Field of Classification Search ................ 206/225; 400/613, 621; 242/588, 588.2, 588.6, 342
See application file for complete search history.

(56) References Cited

U.S. PATENT DOCUMENTS 4,697,756 A * 10/1987 Kofler ...................... 242/533.8
4,878,581 A * 11/1989 Beery ........................ 206/416
5,593,035 A * 1/1997 Taylor et al. ............... 206/397
5,911,380 A * 6/1999 Shiba ......................... 242/348
6,003,668 A * 12/1999 Joyce ......................... 206/397
6,502,784 B1 * 1/2003 Sato ........................... 242/563
6,601,790 B2 * 8/2003 Wilcox et al. .............. 242/348

FOREIGN PATENT DOCUMENTS

JP    2001-142154    5/2001

* cited by examiner

*Primary Examiner*—Daniel J. Colilla
*Assistant Examiner*—Marissa Ferguson-Samreth
(74) *Attorney, Agent, or Firm*—Young & Thompson

(57) ABSTRACT

In a magazine, when a lid is opened for loading a recording material, a discrimination pin is unlocked and shifted from a first position to a second position. When a magazine is set to a printer processor, a positioning pin presses the discrimination pin to shift to the first position, at which the discrimination pin is locked. After removal of the magazine from the printer processor, the discrimination pin is in the first position. When the lid is opened to load fresh recording material in the magazine, the discrimination pin is in the second position. It is discriminated by detecting the position of the discrimination pin whether the magazine is a partially used one. When the partially used magazine is set to the printer processor, a forward edge of the recording material is not cut.

10 Claims, 8 Drawing Sheets

MAGAZINE AND IMAGE RECORDING APPARATUS IN WHICH MAGAZINE IS USED

BACKGROUND OF THE INVENTION

1. Field of the Invention

The present invention relates to a magazine for containing a rolled recording material, and to an image recording apparatus to which the magazine is set.

2. Description Related to the Prior Art

In an image recording apparatus, for example a photo printer, a continuous print paper or photographic paper is used as a recording material. The print paper is set to the photo printer in a situation that a paper roll of the print paper is contained in the magazine. When the magazine containing the fresh print paper is set to the photo printer, then the print paper is advanced or drawn from the magazine, and the forward end treatment in which the forward end of the print paper is cut off is made.

The prior photo printer cannot recognize whether a part of the print paper in the magazine has been already used or the print paper is a fresh one after the exchange. Therefore, the forward end treatment is made when the magazine is set to the prior photo printer. Accordingly, when the setting and removing of the magazine is often made, the waste of the print paper increases in proportion of frequency of the setting to the photo printer.

In order to solve this problem, a printer described in the Japanese Patent Laid-Open Publication No. 2001-142154 includes a memorizing device for memorizing information whether the forward end treatment has been made. As the memorizing device, a hard disc and the like are used and fixed to inside of the printer. Accordingly, when the one magazine is used in plural printers, the forward end treatment is not made in the same printer, but made in another one.

SUMMARY OF THE INVENTION

An object of the present invention is to provide a magazine and an image recording apparatus, in which an unnecessary forward end treatment is prevented when a magazine is exchanged.

Another object of the present invention is to provide a magazine which can provide the history information of opening shift of a lid.

In order to achieve the objects and the other object, a magazine of the present invention has a magazine main body for loading a recording material, an openable lid, a discrimination member for representing a history of opening shift of the lid. The discrimination member shifts between a first position representing that the lid is not opened and a second position representing that the lid is opened. A biasing means biases the discrimination member toward the second position. A sustaining member locks the discrimination member at the first position.

When the magazine is set to an image recording apparatus, the discrimination member is shifted from the second position to the first position, and locked by the sustaining member. After the magazine is removed from the image recording apparatus, the discrimination member is locked at the first position by the sustaining member. When the lid is opened to load the recording material, the sustaining member shifts to a lock releasing position, and allows to shift the discrimination member back to the second position. When the lid is closed, the sustaining member shifts back to be in the situation of locking the discrimination member.

In the magazine into which the lid is opened to load the fresh recording material, the discrimination member is positioned in the second position. In the magazine which is only removed from the image recording apparatus, the discrimination member is in the first position. From the position of the discrimination pin is discriminated whether the fresh magazine or partially used magazine is set to the image recording apparatus.

In the preferred embodiment of the present invention, while the partially used magazine is slid on the image recording apparatus to set to a predetermined position, a positioning pin presses an end of the discrimination member to shift from the second position to the first position. In the partially used magazine, as the discrimination member is in the first position, the discrimination member is not pressed by the positioning pin.

In the image recording apparatus of the present invention, while the magazine is set to the image recording apparatus, the discrimination, whether the magazine is a fresh one or partially used one, is made by detecting the shift of the discrimination member in setting the magazine to the image recording apparatus. When the fresh magazine is set, the forward end of the recording material is cut off to prevent the jamming and the decrease of image quality. Otherwise, when the partially used magazine is set, an end treatment is not made. When it is discriminated that the magazine is a partially used one, an initial value (a length of the fresh recording material) is written to the memorizing means for memorizing the remaining length.

According to the present invention, it is discriminated whether the partially used magazine removed from the image recording apparatus is set again. And the end treatment is not made to the recording material in the partially used magazine. Thus the waste of the recording material is prevented. Further, an end of the discrimination member is positioned in a hole in which the positioning pin is inserted. Accordingly, the discrimination member is not unnecessarily bent.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
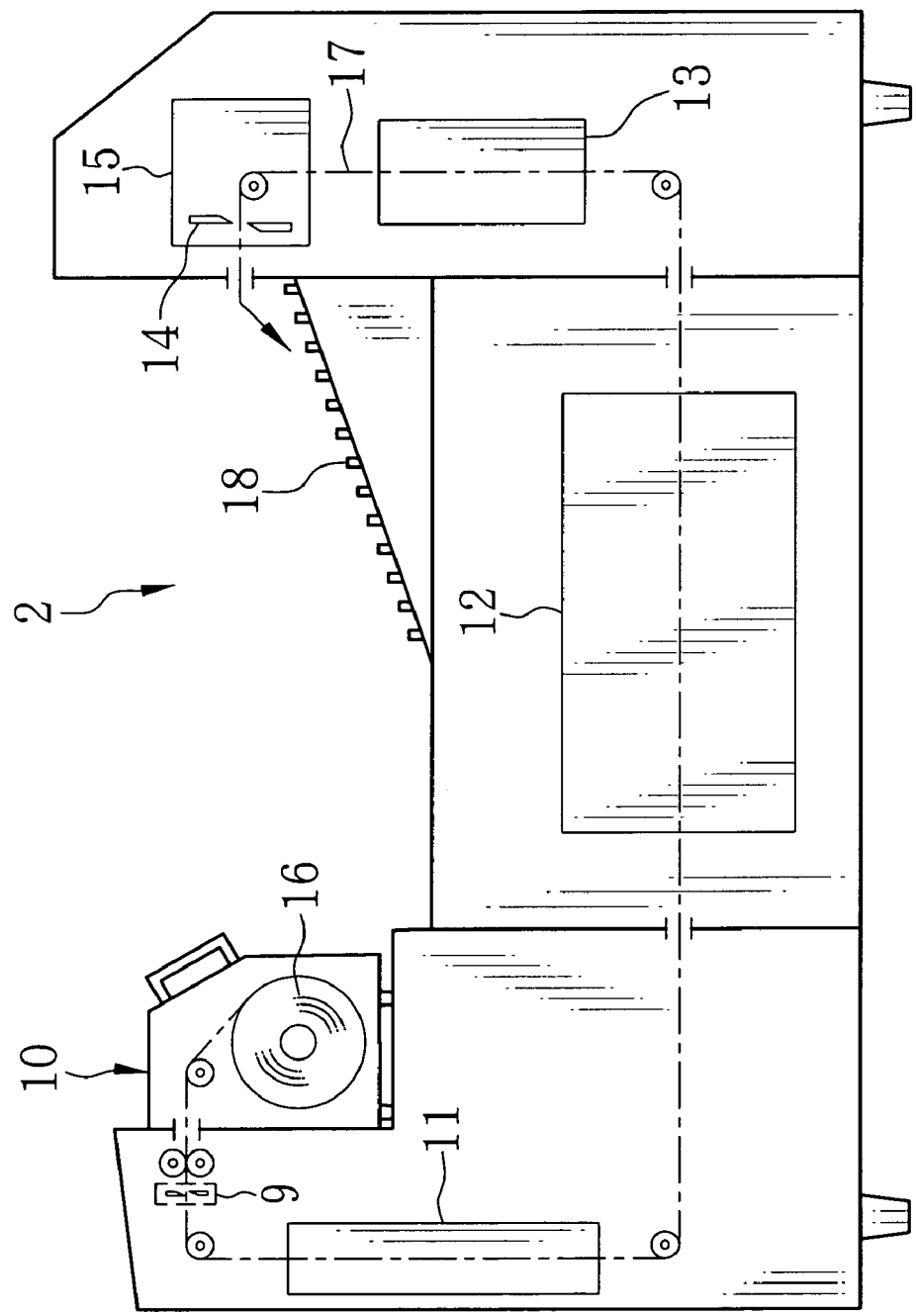
FIG. 1 is a schematic diagram of a printer processor to which the present invention is applied.

In FIG. 1, a printer processor 2 as a combined apparatus is constructed of an end cutter 9, a magazine 10, an exposure section 11, a developing section 12, a drying section 13, a cutting section 14, and a sorting section 15. A continuous photographic color paper 16 advanced from the magazine 10 is fed toward to the end cutter 9 on a transport path 17 illustrated with a chain line. The end cutter 9 cut off a forward end portion of the color paper 16 for preventing the jamming and the decrease of image quality, and the cut end portion is fed to a trash box (not shown). In the exposure section 11, an image formed on an exposed photo film is printed on the color paper 16. Note that an exposure method in the exposure section 11 may be a direct exposing method in which a light transmitting through the photo film is directly applied to the color paper 16, and otherwise, may be a method in which a lazer beam is scanned for exposure on the basis of an image data read out from the photo film.

After the exposure is made, a development, a bleaching, a cleansing in the developing section 12 and a drying of the color paper 16 are carried out. After the drying, the color paper 16 is cut the cutting section 14 to photo prints in accordance with a size of each photo print, and they are sorted in the sorting section 15 to a discharging tray 18 in accordance with printing orders.

Figure 2:
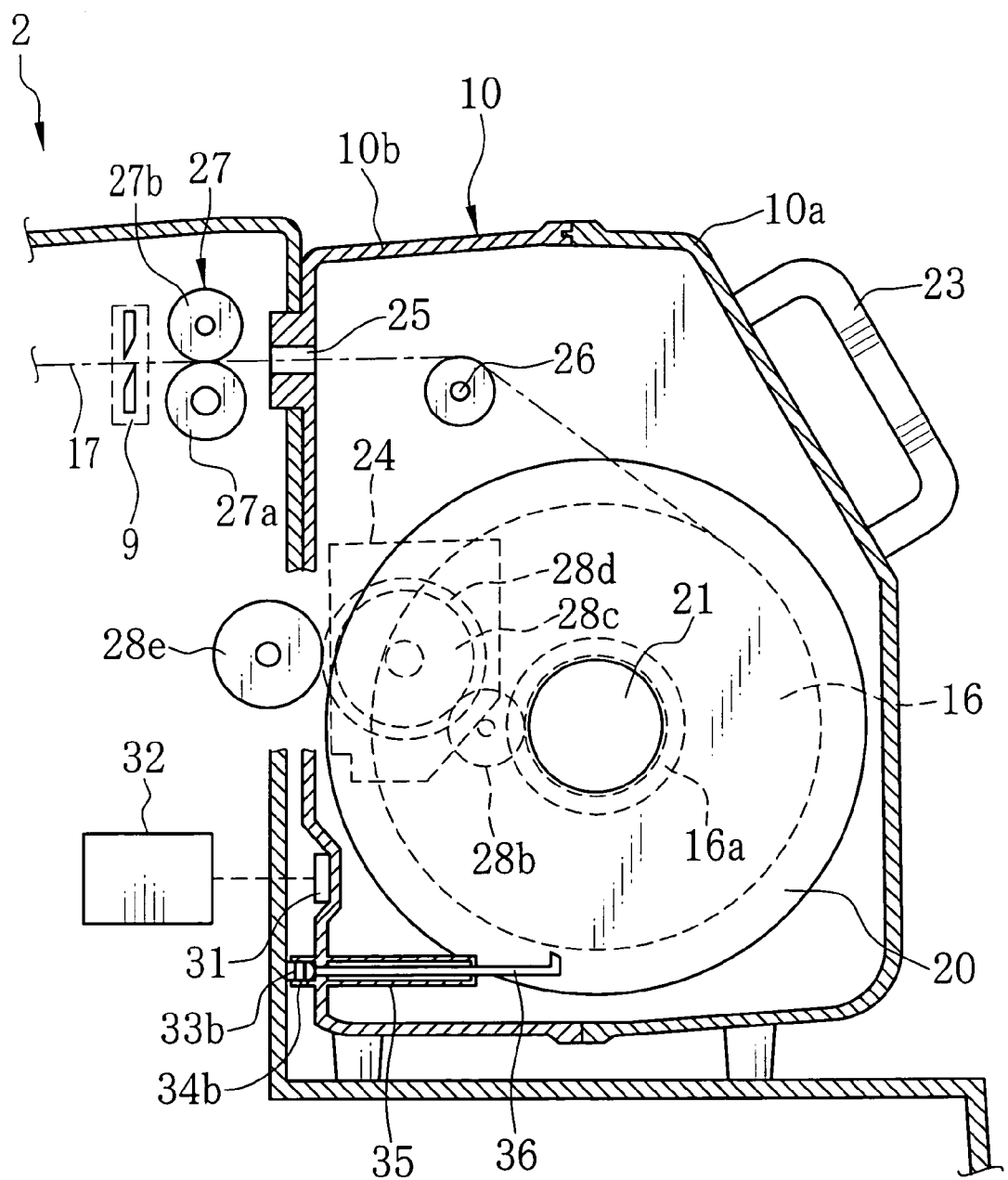
FIG. 2 is a vertical sectional view illustrating a structure of a magazine.
Figure 3:
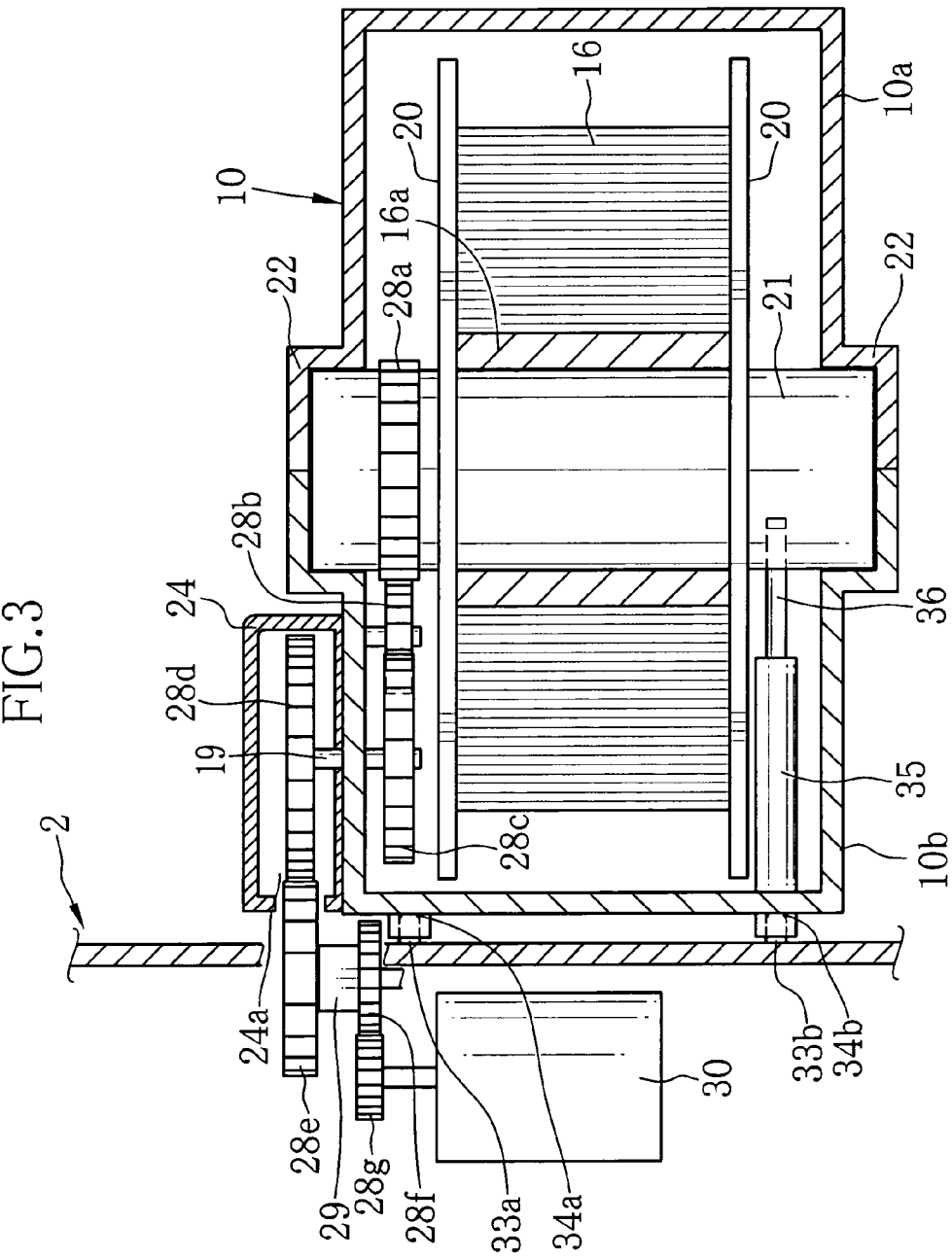
FIG. 3 is a cross sectional view illustrating a structure of the magazine.

As shown in FIGS. 2 and 3, the continuous color paper 16 is wound around a roll core 16a. In the roll core 16a, a spool 21 is inserted, and both ends of the spool 21 are fitted into spool bearings 22 of the magazine 10. Thus the color paper 16 is contained in the magazine 10. As the spool 21 is firmly combined to the roll core 16a, a paper roll of the color paper 16 is rotated in accordance with the rotation of the spool. Note that a width of the color paper 16 depends on a print size and therefore plural sorts of the color paper 16 are used. A pair of the flanges 20 can be attached to the optional position of the spool corresponding to the width of the color paper 16 to be used.

The magazine 10 is constructed of a lid 10a provided with a grip 23, and a magazine main body 10b in which the paper roll is loaded. The lid 10a is openably attached to the main body 10b, and opened and closed when the color paper 16 is exchanged. The lid 10a is locked to the main body 10b with a buckle and the like such that the magazine 10 is closed in a light tight fashion.

A side surface of the main body 10b is provided with a gear cover 24 for protecting a fourth gear 28d about which an explanation is made later. Further, a front surface of the main body 10b (a surface confronting to the printer processor 2) has a feed out opening 25 through which the color paper 16 is fed out. Furthermore, the front surface is provided with a shutter (not shown) for closing the feed out opening 25. When the magazine 10 is not used, the feed out opening 25 is closed by the shutter to shield an outer light into the magazine 10. A guide roller 26 is provided near the feed out opening 25. The guide roller 26 guides the color paper 16 to the feed out opening 25.

A first gear 28a is provided with the one end of the spool 21. The first gear 28a meshes with a second gear 28b provided in the main body 10b. The second gear 28b is meshed with a third gear 28c, which is connected through a connecting shaft 19 with the fourth gear 28d disposed outside the main body 10b.

A part of the fourth gear 28d protected by the gear cover 24 is exposed through an opening 24a formed in a gear cover 24. And in completion of setting the magazine 10, the fourth gear 28d is meshed through the opening 24a with a fifth gear 28e partially protruding from a case of the printer processor 2.

To the fifth gear 28e provided in the printer processor 2 is connected an electromagnetic clutch 29. The electromagnetic clutch 29 is further connected to a motor 30 through a sixth gear 28f and a seventh gear 28g. When the color paper 16 is fed out from the magazine 10, the electric clutch 29 turns on, and the rotation of the motor 30 is transmitted through the fifth gear 28c to the spool 21. And when the color paper 16 is fed out in printing, the electromagnetic clutch 29 is turned off, and the force of reverse rotation of the motor 30 is not transmitted to the fifth gear 28e. Further, when the rewinding of the color paper 16 is made, the electromagnetic clutch 29 is turned on. Therefore the reverse rotation of the motor 30 is transmitted to the fifth gear 28e. Thus, the spool 21 reversely rotates so as to wind the color paper 16 into the magazine 10. Note that a sun and planet clutch having a sun and planet gear structure may be used instead of the electromagnetic clutch 29.

The color paper 16 fed out through the feed out opening 25 of the magazine 10 is nipped by the feed roller pair 27. The feed roller pair 27 is constructed of a lower roller 27a which is driven by a feed motor (not shown), and an upper roller 27b which presses the lower roller to nip the color paper 16. Thus the feed roller pair 27 feeds the color paper 16 toward the exposure section 11 at a predetermined speed. The upper roller 27b are shiftable between a feeding position for pressing the lower roller 27a to nip the color paper 16 and a retracting position for leaving the lower roller to release the nip of the color paper 16.

To a lower side of the front surface of the main body 10b is attached a radio frequency identification (RFID) tag 31 which stores a discrimination data of the situation of the color paper 16 contained in the magazine 10. When the magazine 10 is set to the printer processor 2, a wireless reading/writing device 32 sends a radio signal and receives the discrimination data as a correspond of the RFID tag 31. Then the discrimination data is sent to the printer processor 2.

The reading/writing device 32 further rewrites the discrimination data representing a situation of the color paper 16 in the magazine 10 just after the exchange of the magazine, the printing of the image or the like. Note that the discrimination data concretely contains data of remaining length, width, surface type, production lot number and the like. Further, an IC card may be used for storing the discrimination data instead of the RFID tag 31.

The remaining length of the color paper 16 can be calculated by counting with a counter a length of the advanced color paper 16. When the magazine 10 is removed from the printer processor 2, the electromagnetic clutch 29 and the motor 30 are driven to rewind the unused color paper 16 into the magazine 10. When the rewinding is completed, the remaining length of the color paper 16 in the magazine 10 is written in the RFID tag 31 by the reading out/writing device 31. In this case, if the magazine 10 is thereafter set to another printer processor, the information of the remaining length of the color paper 16 is managed. Note that the remaining length of the color paper 16 is reset to an initial value of the total length of the fresh rolled color paper 16 (the initial value can be set in the printer processor 2), when the printer processor 2 detects the exchange of the color paper 16.

Figure 4:
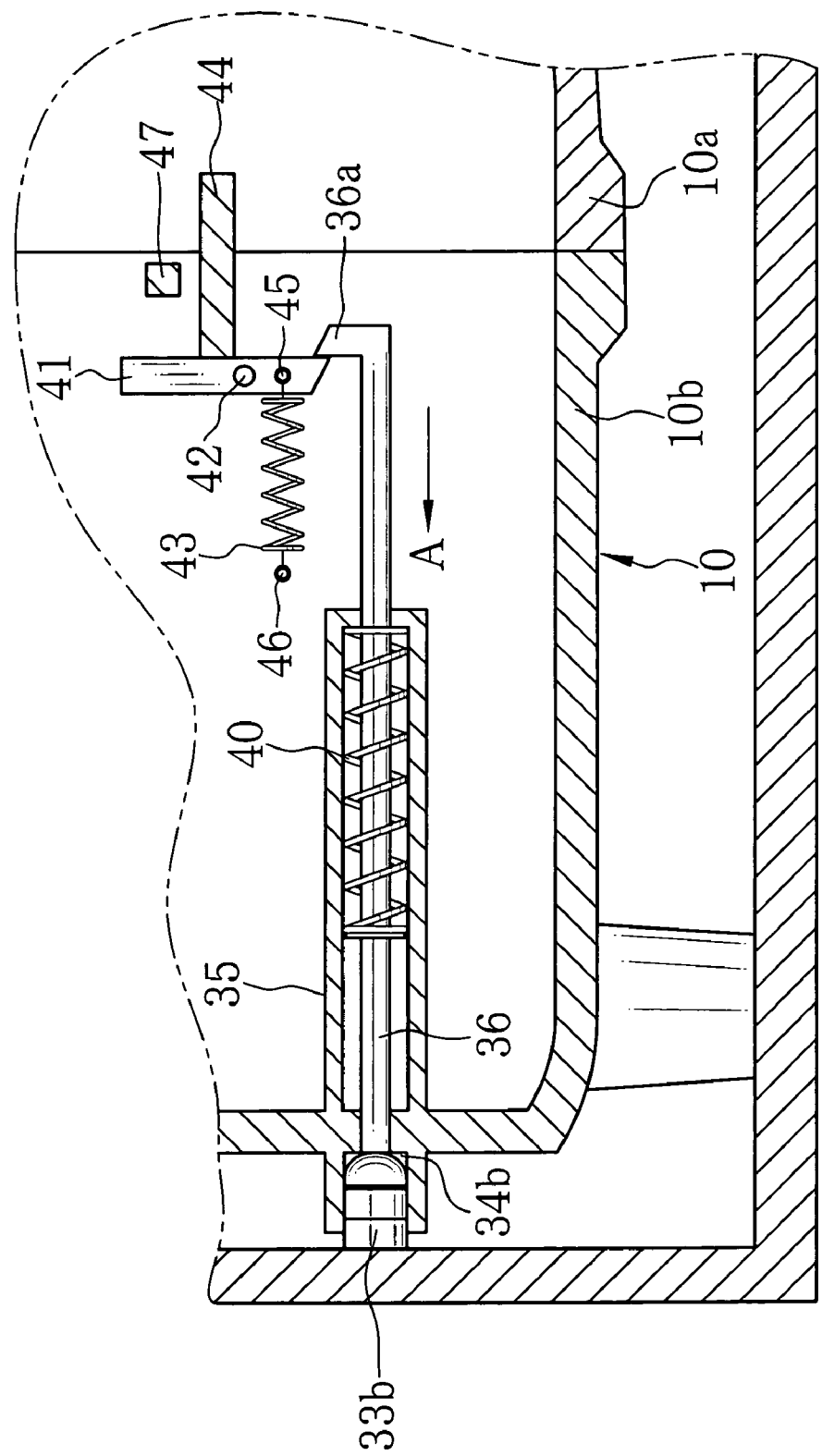
FIG. 4 is an exploded sectional view of a discriminating pin for opening shift of a lid of the magazine.

As shown in detail in FIG. 4, in a lower side of the front surface of the main body 10b, there are positioning holes 34a, 34b into which are inserted positioning pins 33a, 33b formed on the printer processor 2. The positioning pins 33a, 33b and the positioning holes 34a, 34b are used for positioning the magazine 10 to the printer processor 2 at attachment of the magazine 10 to the printer processor 2. These positioning holes 34a, 34b are formed in pipe-like protrusions.

Figure 5:
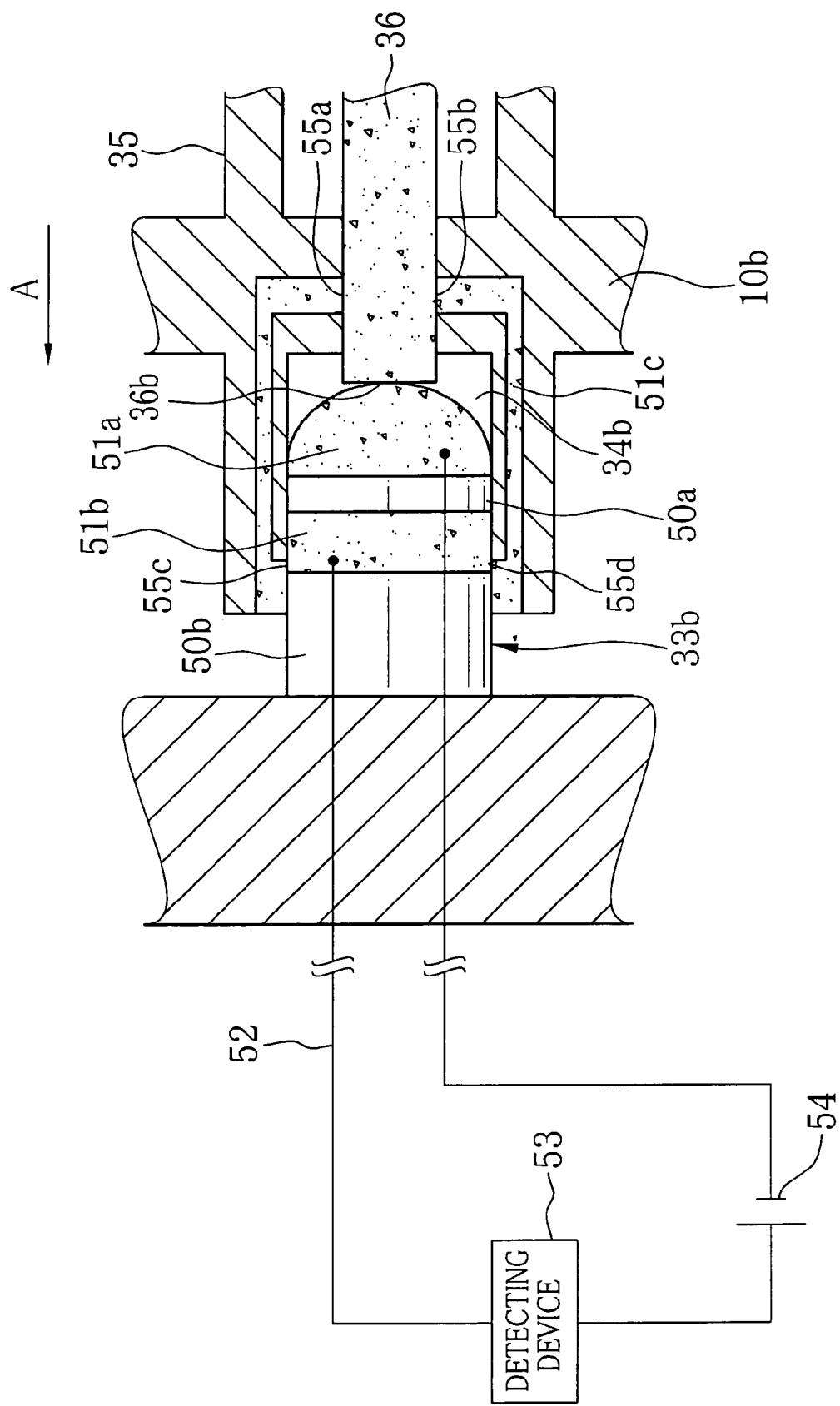
FIG. 5 is an exploded sectional view illustrating a positional relation of a positioning pin to a positioning hole in setting the magazine.

In the magazine 10 is formed a sleeve 35 connected with the positioning hole 34b. In the sleeve 35, a discrimination pin 36 is inserted. When the lid 10a is open, an outer end 36b (see FIG. 5) of the discrimination pin 36 protrudes into the positioning hole 34b. When the lid 10a is thereafter closed, the situation of the protrusion of the outer end 36b is kept. This protruding position of the outer end 36b of the discrimination pin 36 signals the exchange of the color paper 16.

The discrimination pin 36 is formed of a conductive material. An inner end of the discrimination pin 36 has a hook 36a, and the discrimination pin 36 is biased in a direction A by a spring 40 as a biasing member. The hook 36a is engaged with an end of a lock lever 41 as a sustaining member for sustaining the discrimination pin 36 in the first position against the bias of the spring 40.

The lock lever 41 is rotatably attached to a rotary shaft 42 which is formed on a main body 10b of the magazine 10. The lock lever 41 is biased by a spring 43 in the clockwise direction. A push pin 44 formed on an inner surface of the lid 10a contacts to the lock lever 41 in the upper side from the rotary shaft 42, so as to keep the lock lever 41 in a position in FIG. 4 against the bias of a spring 43. An end of the spring 43 is connected to a pin 45 formed on the lock lever 41, and another end of the spring 43 is connected to a pin 46 in the main body 10b. And the lock lever 41 swings in a clockwise direction, when the push pin 44 retracts interlocked with opening the lid 10a.

When the lock lever 41 is biased by the spring 43 to swing in the clockwise direction, a stopper 47 in a main body 10b contacts to a back end of the lock lever 41 to stop the swing thereof.

The positioning pin 33b is constructed of first and second insulating portions 50a, 50b and first and second conductive portions 51a, 51b. The first and second conductive portions 51a, 51b are connected with a detector 53 and a battery or suitable power source 54 through a wire 52, and the battery 54 applies voltage. The detector 53 detects the conductivity between the first and second conductive portions 51a, 51b when the electric current flows through the wire 52. Further, a wall of the positioning hole 34b of the main body 10b has a third conductive portion 51c which contact through contact points 55a-55d to the discrimination pin 36 and a positioning pin 33b. Note that the dotted portions in this figure are insulating portions.

Figure 6:
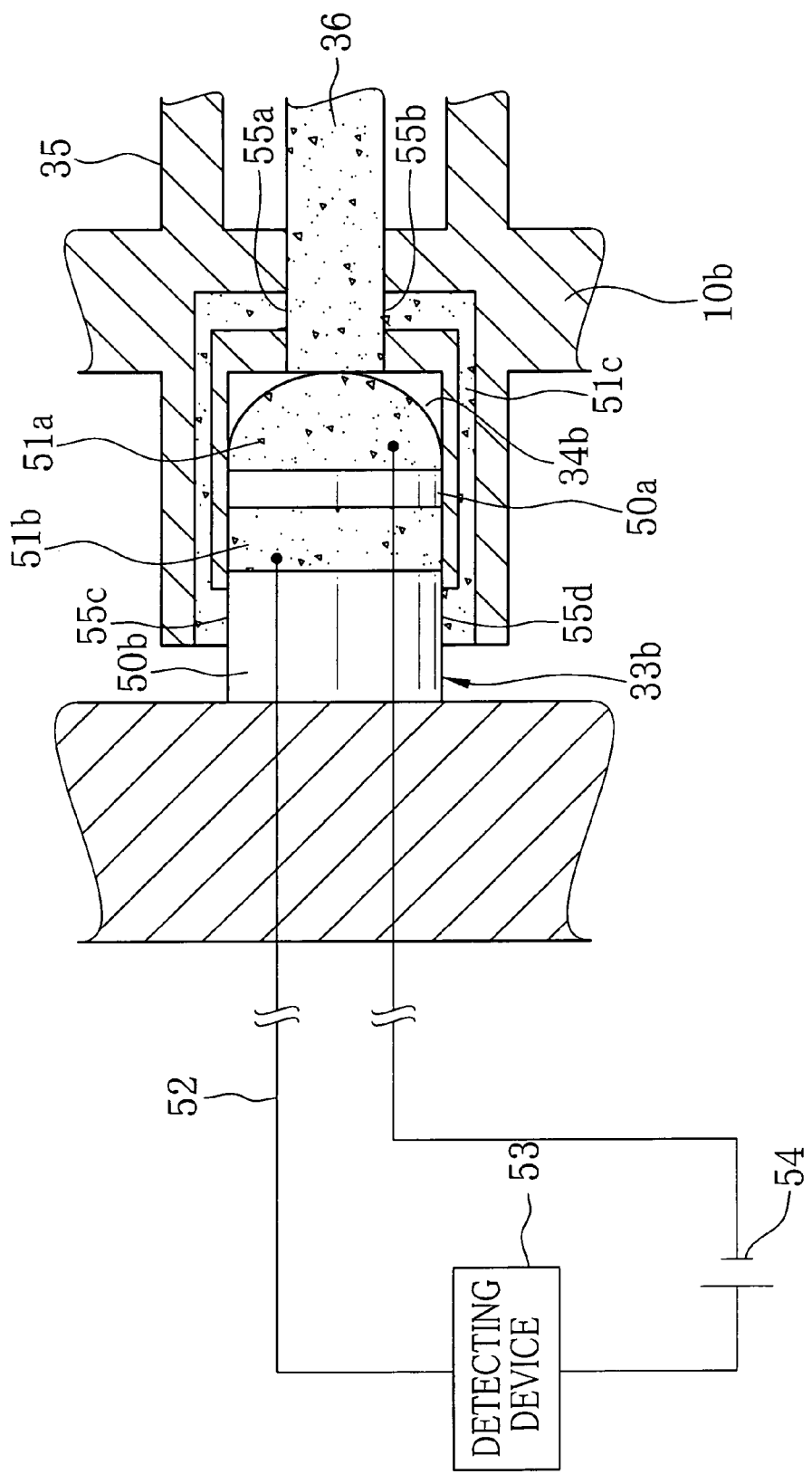
FIG. 6 is an exploded sectional view similar to FIG. 5, in completion of setting the magazine.
Figure 9:
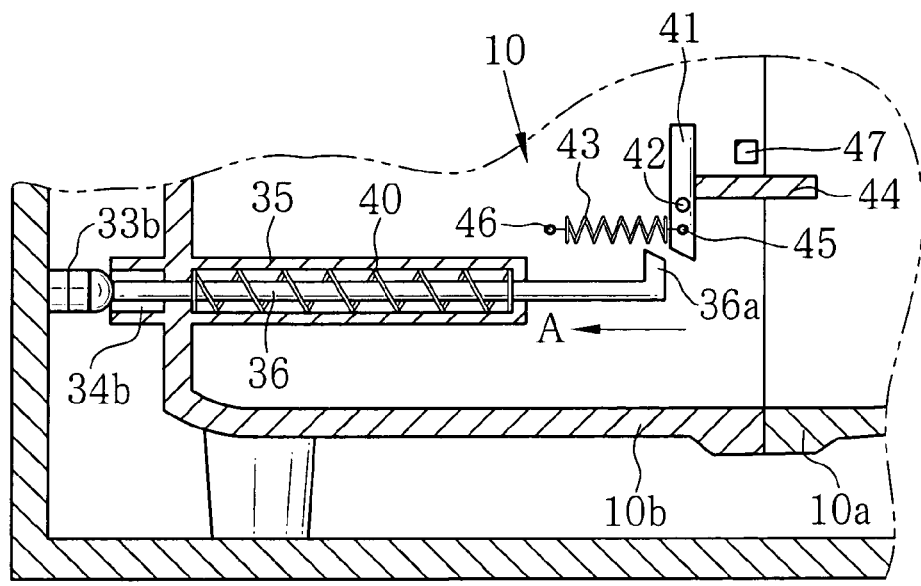
FIGS. 9 and 10 are partial sectional views respectively illustrating situations of setting the magazine to the printer processor.
Figure 10:
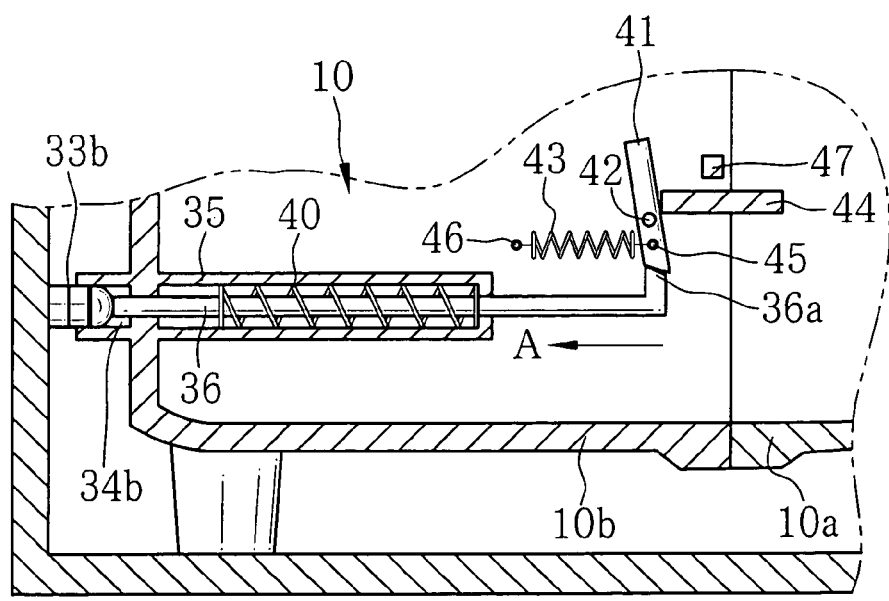

After the fresh paper roll is loaded in the magazine 10 and the lid 10a is closed, the discrimination pin 36 is biased by the spring 40 such that the end of the discrimination pin 36 is protruded in the positioning hole 34b. In the situation that the magazine 10 is deposited on the printer processor 2, as shown in FIG. 9, the positioning pin 33b confronts to the positioning hole 34b, and the first conductive portion 51a and the second conductive portion 51b are in a nonconductive state (OFF-state). When the magazine 10 is slid, the positioning pin 33b presses the discrimination pin 36 against the bias of the spring 40, and as shown in FIG. 10, the positioning pin 33b is gradually inserted in the hole 34b. Thereafter, in the situation illustrated in FIG. 5, the first conductive portion 51a and the second conductive portion 51b are in the conductive state (ON-state). When the magazine 10 slides furthermore, as shown in FIG. 6, the discrimination pin 36 is retracted from the positioning hole 34b, and locked with the lock lever 41 to keep the retracting position. In this retracting position, the first and second conductive portions 51a, 51b are in the nonconductive state. As described above, in the new magazine in which the end treatment is necessary, the state of the first and second conductive portions 51a, 51b is sequentially changed from OFF-state, ON-state, and OFF-state.

Otherwise, there is a case that the partially used magazine 10 is removed from the printer processor 2 and set to another printer processor in this situation of the magazine, namely, without opening and closing the lid 10a to load the fresh color paper. In this case, the discrimination pin 36 is kept in the retracting position with the lock lever 41. Thereby, since the positioning pin 33b does not press the discrimination pin 36, the first and second conductive portions 51a, 51b are always in the OFF-state, independent of the setting situation of the magazine 10. As described above, on the basis of the ON/OFF-state of the first and second conductive portions 51a, 51b, it is discriminated whether the magazine is the fresh one for which the end treatment is necessary or the partially used one.

Effects of the above embodiment will be explained with reference to FIGS. 4-10. In order to exchange the color paper 16, the magazine 10 is removed from the printer processor 2 in the situation of FIG. 4. Thereafter the lid 10a is released from the engagement with the main body 10a and opened. Then the lock lever 41 whose position has been kept in an initial position by the push pin 44 is biased by the spring 43 to swing in the clockwise direction, and to contact to the stopper 47. Thus the lock of the hook 36a is released by rotating the lock lever 41.

Figure 7:
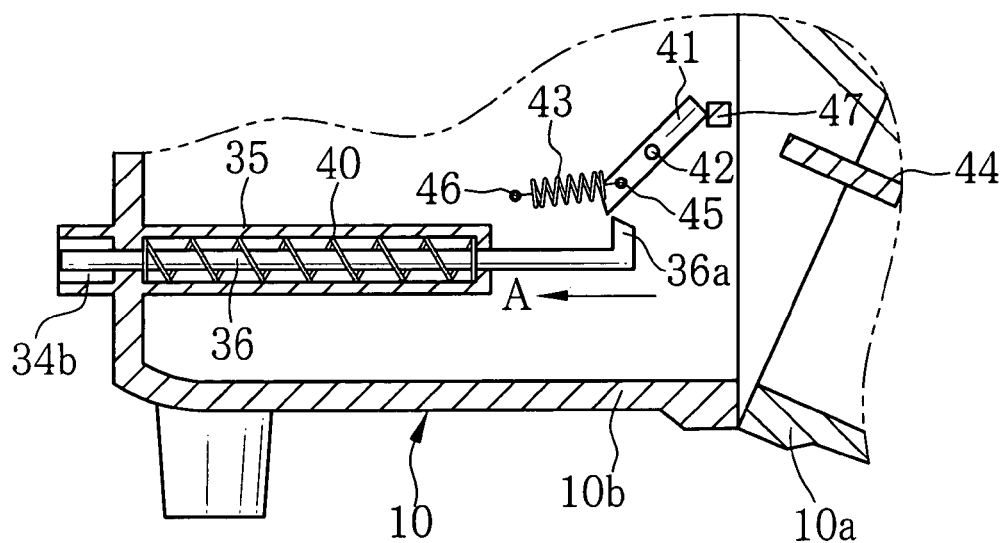
FIG. 7 is a partial sectional view of a magazine, illustrating a situation that the lid is open.
Figure 8:
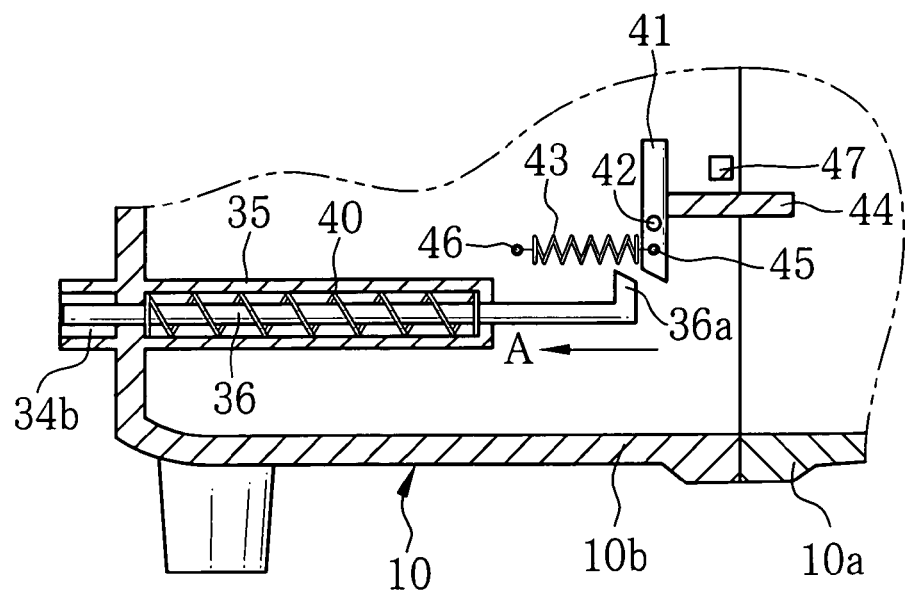
FIG. 8 is a partial sectional view of a magazine, illustrating a situation that the lid is closed again.

When the lock lever 41 is released from the engagement with the hook 36a, the discrimination pin 36 biased by the spring 40 moves in the arrowed direction A toward protruding position. In the protruding position, as shown in FIG. 7, the outer end 36b of the positioning pin 36 is protruded in the positioning hole 34b. After the exchange of the color paper 16 is completed, the lid 10a is closed, and as shown in FIG. 8, the lock lever 41 is shifted back to the initial position by the push pin 44. In this case is kept the situation that the outer end 36b of the discrimination pin 36 is protruded in the positioning hole 34b.

As shown in FIG. 9, in the situation that the magazine 10 is simply deposited on the printer processor 2, the positioning pin 33b is confronted to the positioning hole 34b, and the first and second conductive portions 51a, 51b are in the OFF-state. When the magazine 10 is slid, the positioning pin 33b are gradually inserted in the positioning hole 34b, and therefore the discrimination pin 36 is pressed. Thereafter, in the situation illustrated in FIG. 5, the first and second conductive portions 51a, 51b are in the ON-state. When the magazine 10 is slid furthermore, as shown in FIG. 6, the discrimination pin 36 is retracted from the positioning hole 34b, and locked by the lock lever 41 to keep in the retracting position. In this situation, the first and second conductive portions 51a, 51b are in the OFF-state. The detector 53 regards the magazine 10 as the fresh one when detecting the ON-state of the first and second conductive portions 51a, 51b.

Otherwise, in the partially used magazine 10, the discrimination pin 36 is kept in the retracting position. In setting the partially used magazine 10 to the printer processor 2, the first and second conductive portions 51a, 51b are continuously in the OFF-state. In this case, the detector 53 regards the magazine as the partially used one.

The magazine 10 further includes a nip roller pair (not shown) disposed between the supply opening 25 and the guide roller. The nip roller pair is driven through a gear train (not shown) by the gear 28d. In the situation that the forward end of the color paper 16 is nipped by the nip roller pair, the fresh paper roll is contained in the magazine 10. Further, after work of the printer processor in one day, the motor 30 is reversely rotated to feed the color paper 16 back from the printer processor 2 and to rewind the color paper 16 to the paper roll. Also in this case, the rewinding of the color paper 16 is made in the situation that the forward end of the color paper 16 is nipped by the nip roller pair.

When the setting of the magazine 10 is completed, a paper feeding operation for feeding the color paper 16 starts in the printer processor 2. When the motor 30 is rotated, the rotational force of the motor 30 is transmitted through the gear train 28f-28a to the spool 21. The rotation of the spool 21 is transmitted through the roll core 16a to rotate the paper roll. Simultaneously, the nip roller pair rotates to advance the forward end of the color paper 16. Thus the forward end is sent through the supply opening 25 and the feed roller pair 27 to and the cutter 9.

When the fresh magazine 10 is set, the rotation of the motor 30 is stopped just after the passing of the forward end of the color paper 16 at the cutter 9. When the feeding of the paper is end, the electromagnetic clutch 29 is set to the OFF-state. Then the cutter 9 is actuated to cut off the forward end which causes the jamming and the decrease of the quality of the recorded image. After the end treatment, the printer processor 2 is in the waiting situation for printing. Then the printing is instructed, and since the electromagnetic clutch 29 is in OFF state, the rotation of the motor 30 is not transmitted to the spool 21, but transmitted to the feed roller pair 27. Thus the feed roller pair 27 is rotated to feed the color paper 16 toward the exposure section 11. The color paper 16 exposed in the exposure section 11 is sent to the developing section 12 to make the developing treatment. Thereafter, the drying of the exposed color paper 16 is made in the drying section 13. After the drying, the color paper 16 is cut in the cutting section to print sheets, and sorted for each print order and discharged in the discharging tray 18.

When the partially used magazine 10 is set, the paper feeding operation is completed in the situation that the forward end of the color paper 16 is nipped by the feed roller pair 27. Thereafter, the printer processor 2 is in the waiting situation for printing. In this case, as the forward end of the color paper 16 is not cut off, the waste of the color paper 16 is prevented.

In the above structure, when the advance of the color paper 16 is not made in the paper advancing operation after the attachment of the magazine 10, then the reason therefor can be immediately acknowledged as that the color paper 16 is not contained in the magazine 10, or that a feeding system is broken. Furthermore, as the position of the discrimination pin 36 signals whether the color paper 16 is exchanged, it is not necessary to write a memo "completion of exchange" and the like.

In the above embodiment, the opening shift of the lid is signaled by the slide of the discrimination pin 36. However, in the present invention, a discrimination member may be used for signaling two positions through the shift, such as the rotation, the swing, or the like. Further, in the above embodiment, the discrimination pin 36 has the conductive portion, and the shift of the discrimination pin 36 can be detected as the electric current flows through the detector 53. However, in the present invention, the shift can be optically detected with the photo sensor and the like.

Note that when the detector 53 detects the exchange of the color paper 16, then a monitor and the like displays an image indicating that the color paper 16 as photosensitive material is exchanged, and the user may select whether the discrimination information of the magazine is changed. Further, in the above embodiment, the magazine contains the color paper to be used in the printer processor. However, in the present invention, the magazine may contain the roll of a long paper, and the method of use is not restricted in the above description.

Various changes and modifications are possible in the present invention and may be understood to be within the present invention.

What is claimed is:

1. A magazine for containing a rolled recording material, said magazine being removably set to a predetermined position of an image recording apparatus for recording an image on said recording material, said magazine comprising:
   a magazine main body for loading recording material;
   a lid openably attached to said magazine main body, said lid being opened and closed when said recording material is loaded in said magazine main body;
   a discrimination member being shiftable between a first position and a second position, said first position representing that a partially used recording material is contained, said second position representing that a fresh recording material is contained;
   a biasing member for biasing said discrimination member to shift to said second position; and
   a sustaining member for sustaining said discrimination member in said first position when said discrimination member is shifted to said first position, said sustaining member releasing the sustaining of said discrimination member to allow said discrimination member to shift from said first position to said second position when said lid is opened after removal from said predetermined position.

2. A magazine as claimed in claim 1, wherein when discrimination member is in said second position, said discrimination member is shifted from said second position to said first position in accordance with magazine setting to said predetermined position of said image recording apparatus.

3. A magazine as claimed in claim 1, further comprising a hole provided in said magazine main body, an end of said discrimination member in said first position being retracted from said hole, said end of said discrimination member in said second position being protruded in said hole.

4. A magazine as claimed in claim 3, wherein in accordance with said magazine setting to said predetermined position of said recording device, a positioning pin of said image recording apparatus comes in said hole, and when said discrimination member is in said second position, then said positioning pin presses said end of said discrimination member to shift said discrimination member to said first position.

5. A magazine as claimed in claim 4, further comprising:
   a spring provided for said magazine main body, said spring biasing said sustaining member to a lock releasing position at which said sustaining member cannot sustain said discrimination member; and
   a push member provided on said lid for pressing said sustaining member to prohibit said sustaining member from shifting to said lock releasing position when said lid is closed, wherein said push member, when said lid is opened, allows said sustaining member to shift to said lock releasing position by bias of said spring.

6. A magazine as claimed in claim 5, further comprising a signal generating means for generating different signals between first and second states, said positioning pin pressing in said first state said end of said discrimination pin in a stroke in which said positioning pin comes in said hole, and said positioning pin not pressing in said second position said discrimination member.

7. An image recording apparatus in which said magazine is removably set to a predetermined position; said magazine including a magazine main body for loading a rolled recording material; a lid openably attached to said magazine main body, said lid being opened and closed when said recording material is loaded in said magazine main body; a discrimination member being shiftable between first and second positions, said first position representing that a partially used recording material is loaded, said second position representing that a fresh recording material is loaded; a biasing member for biasing said discrimination member toward said second position; and a sustaining member for sustaining said discrimination member to said first position when said discrimination member is shifted to said first position, said sustaining member releasing the sustaining of said discrimination member and allowing said discrimination member to shift from said first position to said second position when said lid is opened after the removal of said magazine from said predetermined position; said image recording apparatus comprising:

a detecting means for detecting whether said discrimination member is in said first position or said second position;

a cutter for cutting a forward end of said recording material advanced from said magazine, said cutter cutting said end when said detecting means detects that said discrimination member is in said second position, and said cutter not cutting said end when said detecting means detects that said discrimination member is in said first position.

8. An image recording apparatus as claimed in claim 7, further comprising a positioning pin which comes in a hole of said magazine when said magazine is set to said predetermined position, said positioning pin pressing said end of said discrimination member to shift said discrimination member to said first position when said discrimination member is in said second position.

9. An image recording apparatus as claimed in claim 8, wherein said detecting means generates different signals between a first state and a second state, said positioning pin presses in said first state said end of said discrimination pin in a stroke in which said positioning pin comes in said hole, and said positioning pin does not press said discrimination member in said second state since said discrimination member is in said first position.

10. An image recording apparatus as claimed in claim 9, further comprising a memorizing means in which a remaining amount of said recording material is written, and an initial value is written when said detecting means generates said signal corresponding to said first state.

* * * * *